(12) United States Patent
Boulanger

(10) Patent No.: US 10,724,324 B2
(45) Date of Patent: Jul. 28, 2020

(54) OPERATING SYSTEM CARTRIDGE FOR AN ANNULAR BLOWOUT PREVENTER

(71) Applicant: Cameron International Corporation, Houston, TX (US)

(72) Inventor: Bruce Anthony Boulanger, Houston, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 301 days.

(21) Appl. No.: 15/709,393

(22) Filed: Sep. 19, 2017

(65) Prior Publication Data

US 2019/0085652 A1    Mar. 21, 2019

(51) Int. Cl.
| E21B 33/06 | (2006.01) |
| G01M 3/02 | (2006.01) |
| G01M 3/28 | (2006.01) |
| G01M 3/04 | (2006.01) |
| E21B 33/12 | (2006.01) |

(52) U.S. Cl.
CPC .......... *E21B 33/06* (2013.01); *E21B 33/1208* (2013.01); *G01M 3/02* (2013.01); *G01M 3/04* (2013.01); *G01M 3/2869* (2013.01)

(58) Field of Classification Search
CPC ...... E21B 33/06; E21B 33/1208; G01M 3/02; G01M 3/04; G01M 3/2869
See application file for complete search history.

(56) References Cited

U.S. PATENT DOCUMENTS

| 2,712,458 | A | * | 7/1955 | Lipson | F16L 17/06 |
| | | | | | 285/101 |
| 4,099,699 | A | * | 7/1978 | Allen | E21B 33/06 |
| | | | | | 251/1.2 |
| 5,931,443 | A | * | 8/1999 | Corte, Sr. | E21B 33/06 |
| | | | | | 251/1.2 |
| 9,765,587 | B2 | * | 9/2017 | Boulanger | E21B 33/085 |
| 10,287,841 | B2 | * | 5/2019 | Zonoz | F04B 15/00 |
| 10,301,900 | B2 | * | 5/2019 | Boulanger | E21B 33/085 |
| 2012/0318387 | A1 | * | 12/2012 | Chen | F16L 29/00 |
| | | | | | 137/614 |
| 2014/0262313 | A1 | * | 9/2014 | Gilmore | E21B 33/085 |
| | | | | | 166/363 |
| 2015/0144813 | A1 | * | 5/2015 | DeOcampo | E21B 33/06 |
| | | | | | 251/1.2 |
| 2015/0330173 | A1 | * | 11/2015 | Trivedi | E21B 33/06 |
| | | | | | 73/152.29 |

(Continued)

*Primary Examiner* — Daniel P Stephenson
(74) *Attorney, Agent, or Firm* — Helene Raybaud

(57) ABSTRACT

An operating system cartridge for an annular blowout preventer includes one or more annular walls that define an annular chamber. The operating system cartridge also includes a piston assembly that has an annular piston positioned within the annular chamber and a pusher plate configured to contact an annular packer assembly of the annular blowout preventer when the operating system cartridge is installed within a housing of the annular blowout preventer. The operating system cartridge further includes one or more fluid conduits extending through the one or more annular walls, wherein the one or more fluid conduits are configured to provide a test fluid to the annular chamber to facilitate testing of the operating system cartridge prior to installation within the housing of the annular blowout preventer.

20 Claims, 6 Drawing Sheets

(56) References Cited

U.S. PATENT DOCUMENTS

| | | | |
|---|---|---|---|
| 2016/0201422 A1* | 7/2016 | Averill | E21B 33/06 166/387 |
| 2017/0218716 A1* | 8/2017 | Boulanger | E21B 33/085 |
| 2018/0334876 A1* | 11/2018 | Zonoz | E21B 33/06 |
| 2019/0085652 A1* | 3/2019 | Boulanger | E21B 33/1208 |

* cited by examiner

OPERATING SYSTEM CARTRIDGE FOR AN ANNULAR BLOWOUT PREVENTER

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An annular blowout preventer (BOP) is installed on a wellhead to seal and control an oil and gas well during drilling operations. A drill string may be suspended inside the oil and gas well from a rig through the annular BOP into the well bore. During drilling operations, a drilling fluid is delivered through the drill string and returned up through an annulus between the drill string and a casing that lines the well bore. In the event of a rapid invasion of formation fluid in the annulus, commonly known as a "kick," the annular BOP may be actuated to seal the annulus and to control fluid pressure in the wellbore, thereby protecting well equipment disposed above the annular BOP. Maintenance operations (e.g., inspection, repair, and/or replacement of parts) for the annular BOP may be time consuming and may cause substantial well downtime.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present embodiments are generally directed to annular blowout preventer (BOPs) systems and methods. Certain disclosed embodiments include an operating system cartridge (e.g., operating system assembly) that includes a piston assembly (e.g., an annular piston assembly) that is driven (e.g., via a fluid) through a chamber (e.g., annular chamber) defined by an inner wall (e.g., annular wall or cylinder), an outer wall (e.g., annular wall or cylinder), and a lower wall (e.g., annular wall or base plate) to adjust a position of a packer assembly (e.g., an annular packer assembly) disposed within a housing (e.g., an annular housing). For example, the piston assembly of the operating system cartridge may be driven in a first direction to drive or adjust the packer assembly from an open position to a closed position to seal an annulus around a drill string disposed through a central bore of the annular BOP and/or to close the central bore.

The operating system cartridge disclosed herein may be preassembled (e.g., the components may be coupled to one another) prior to installation within the housing of the annular BOP. Advantageously, the operating system cartridge may facilitate testing (e.g., of a condition of seals formed by annular sealing elements and/or operation of the piston) of the operating system cartridge prior to installation within the housing of the annular BOP and/or may enable efficient maintenance operations (e.g., inspection, repair, and/or replacement), thereby reducing well downtime, for example.

Figure 1:
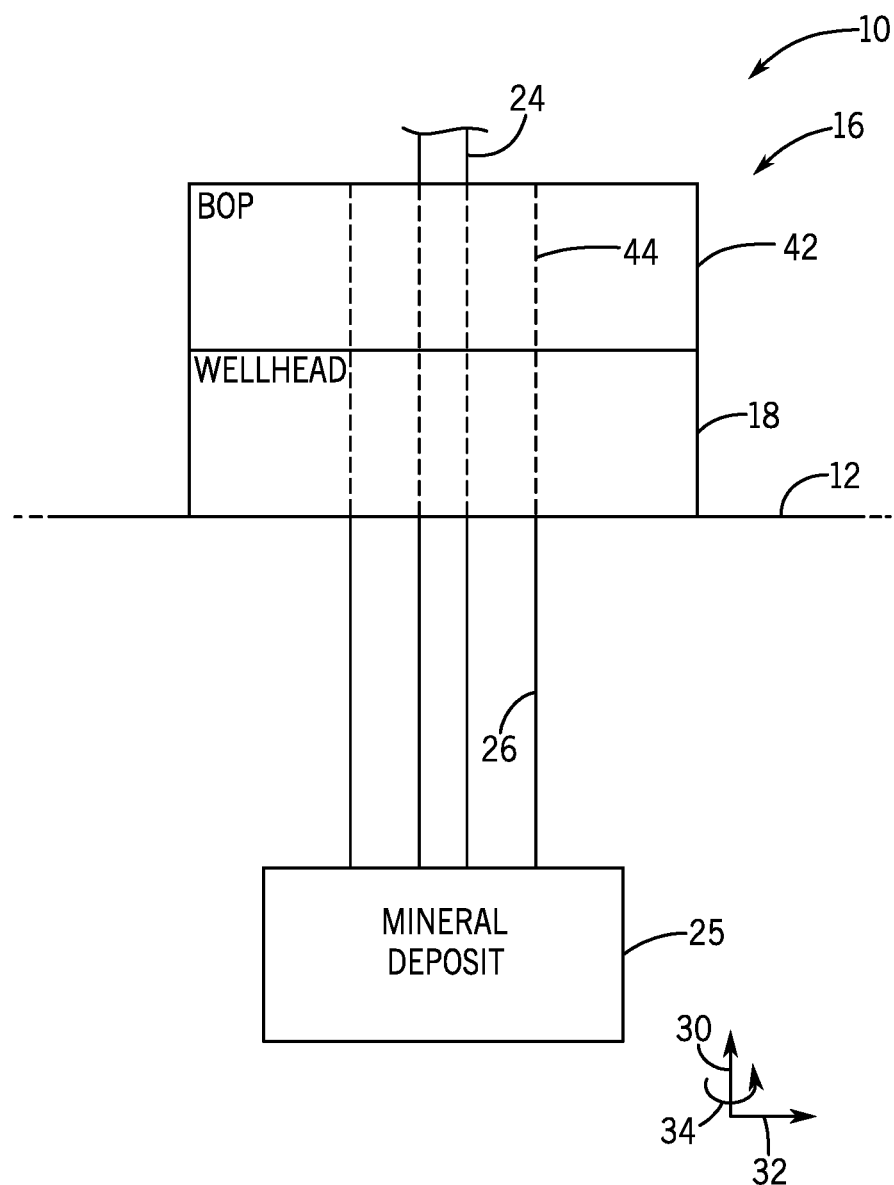
FIG. 1 is a block diagram of an embodiment of a mineral extraction system.

With the foregoing in mind, FIG. 1 is a block diagram of an embodiment of a mineral extraction system 10. The illustrated mineral extraction system 10 may be configured to extract various minerals and natural resources, including hydrocarbons (e.g., oil and/or natural gas), from the earth, or to inject substances into the earth. The mineral extraction system 10 may be a land-based system (e.g., a surface system) or an offshore system (e.g., an offshore platform system). A BOP assembly 16 is mounted to a wellhead 18, which is coupled to a mineral deposit 25 via a wellbore 26. The wellhead 18 may include any of a variety of other components such as a spool, a hanger, and a "Christmas" tree. The wellhead 18 may return drilling fluid or mud to the surface 12 during drilling operations, for example. Downhole operations are carried out by a tubular string 24 (e.g., drill string, production tubing string, or the like) that extends, through the BOP assembly 16, through the wellhead 18, and into the wellbore 26.

To facilitate discussion, the BOP assembly 16 and its components may be described with reference to an axial axis or direction 30, a radial axis or direction 32, and a circumferential axis or direction 34. The BOP assembly 16 may include one or more annular BOPs 42. A central bore 44 (e.g., flow bore) extends through the one or more annular BOPs 42. As discussed in more detail below, each of the annular BOPs 42 includes a packer assembly (e.g., annular packer assembly) that is configured to be mechanically squeezed radially inward to seal about the tubular string 24 extending through the central bore 44 (e.g., to block an annulus about the tubular string 24) or to block flow through the central bore 44. As discussed in more detail below, certain disclosed embodiments include an operating system cartridge (e.g., operating system assembly) that may be used within the annular BOPs 42. The operating system cartridge may be configured to facilitate testing prior to installation within the annular BOPs 42 and/or to enable efficient maintenance operations.

Figure 2:
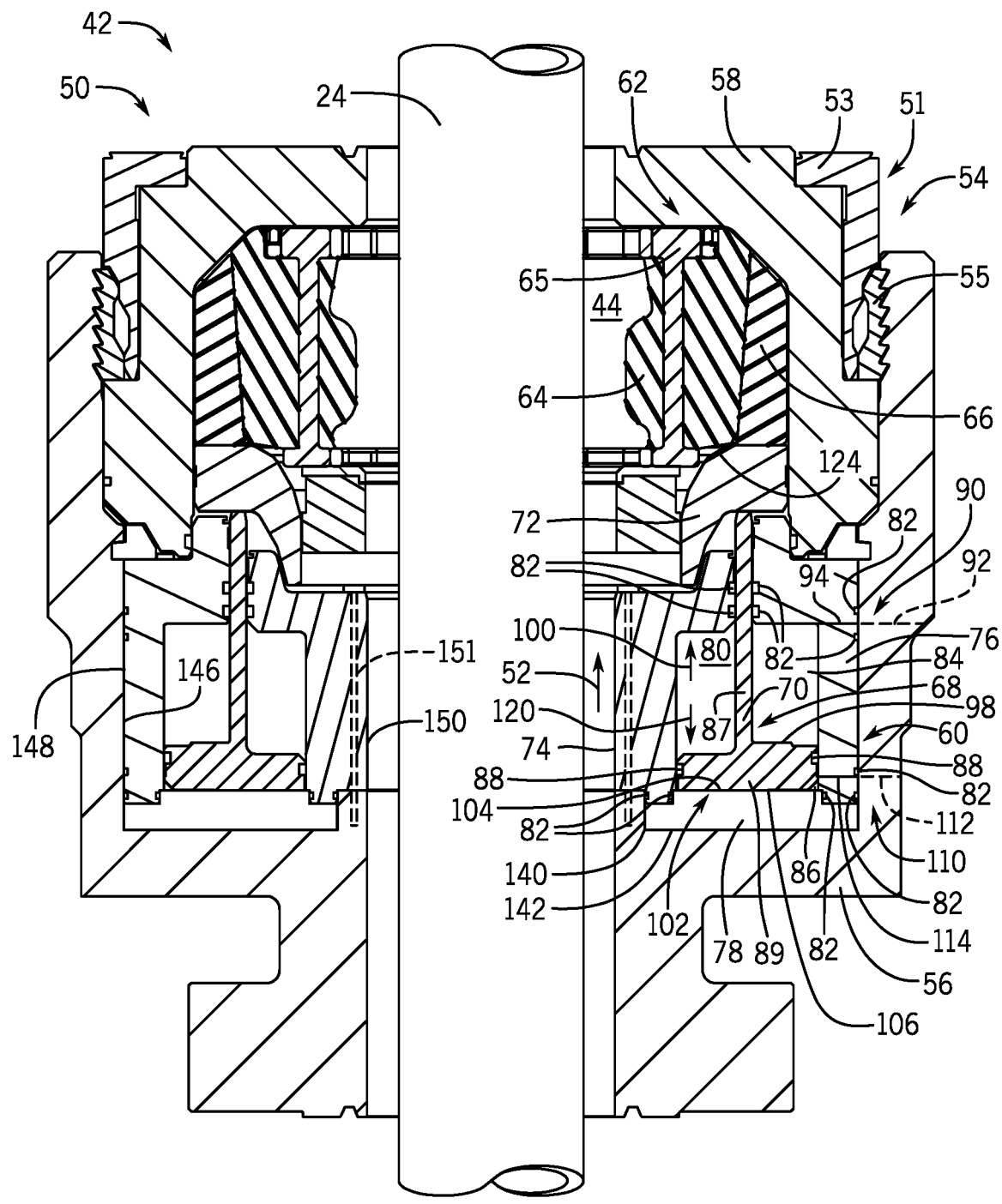
FIG. 2 is a cross-sectional side view of an embodiment of an annular BOP that may be used in the system of FIG. 1, wherein the annular BOP includes an operating system cartridge and is in an open position.
Figure 2:
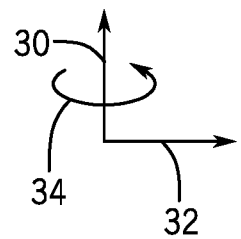

FIG. 2 is a cross-sectional side view of the annular BOP 42 that may be used in the system 10 of FIG. 1. In the illustrated embodiment, the annular BOP 42 is in an open position 50. In the open position 50, fluid may flow through the central bore 44 of the annular BOP 42, as shown by arrow 52. The annular BOP 42 includes a housing 54 (e.g., annular housing) having a body 56 (e.g., annular body, bottom portion, or bottom component) and a top 58 (e.g., annular top portion or top component) coupled to the body 56. For example, in the illustrated embodiment, the top 58 is coupled to the body 56 via a coupling assembly 51 having an actuator ring 53 (e.g., annular actuator ring) that is coupled to the top 58 (e.g., via one or more fasteners, such as bolts, positioned circumferentially about the top 58) and a split lock ring 55 (e.g., toothed c-shaped ring) that is configured to engage corresponding features (e.g., teeth) of the body 56. It should be appreciated that the top 58 may be coupled to body 56 via any suitable coupling assembly, including fasteners, a j-slot coupling assembly, or quarter-turn coupling assembly, for example.

As shown, an operating system cartridge 60 (e.g., annular operating system assembly) and a packer assembly 62 (e.g., annular packer assembly) are positioned within the housing 54. In the illustrated embodiment, the packer assembly 62 includes a packer 64 (e.g., annular packer), multiple inserts 65 (e.g., supporting or reinforcing inserts, which may be embedded in the packer 64), and a donut 66 (e.g., annular structure). In the illustrated embodiment, the inserts 65 extend axially through the packer 64 at multiple locations about the circumference of the packer 64, and the donut 66 circumferentially surrounds the packer 64. In certain embodiments, the packer 64 and the donut 66 are flexible components (e.g., elastomer), and the inserts 65 are rigid (e.g., metal or metal alloy). It should be appreciated that the packer 64 and the donut 66 may be formed from the same or different materials from one another. It should also be appreciated that the packer 64, the inserts 65, and the donut 66 may have any of a variety of configurations. For example, in some embodiments, the packer assembly 62 may include the packer 64 having a modified geometry that enables the packer to seal the central bore 44 without use of the donut 66 or without any flexible or elastomeric structure circumferentially surrounding the packer 62. Thus, in some embodiments, the packer assembly 62 and the annular BOP 42 may be devoid of the donut 66 or devoid of any flexible or elastomeric structure circumferentially surrounding the packer 62.

In the illustrated embodiment, the operating system cartridge 60 includes a piston assembly 68 (e.g., annular piston assembly) having a piston 70 (e.g., annular piston) and a push plate 72 (e.g., annular push plate). As shown, the operating system cartridge 60 also includes an inner wall 74 (e.g., annular wall or cylinder), an outer wall 76 (e.g., annular wall or cylinder), and a lower wall 78 (e.g., annular wall or base plate) that define a chamber 80 (e.g., annular chamber). In some embodiments, the inner wall 74 and the outer wall 76 are coupled (e.g., via one or more fasteners, such as bolts) to the lower wall 78 to define the chamber 80. It should be appreciated that the operating system cartridge 60 may include any number of annular walls and may have any of a variety of other configurations and components that define the chamber 80 that supports the piston 70. For example, the operating system cartridge 60 may include one or more upper walls (e.g., annular wall or top plate) coupled (e.g., via fasteners, such as bolts) to the inner wall 74 or the outer wall 76 and positioned opposite the lower wall 74 to define the chamber 80. For example, in some embodiments, one or more of the annular walls 74, 76, 78 may be integrally formed or the operating system cartridge 60 may include a trough or one-piece structure that defines the chamber 80.

In the illustrated embodiment, the operating system cartridge 60 also includes multiple annular seals 82 (e.g., supported within seal grooves), which are configured to block fluid flow between the chamber 80 and an external environment (e.g., external to or outside of the chamber 80) and/or to block fluid flow between the chamber 80 and the central bore 44 when the operating system cartridge 60 is installed within the housing 54. For example, one or more annular seals 82 may be positioned to form a seal between portions of the walls 74, 76, 78, to form a seal between a shaft portion 87 (e.g., annular shaft portion) of the piston 70 and the inner wall 74, and/or to form a seal between the shaft portion 87 of the piston 70 and the outer wall 76. As shown, one or more annular seals 88 may form a seal between a plate portion 89 (e.g., annular plate portion) the piston 70 and the inner wall 74, and one or more annular seals 88 may form a seal between the plate portion 89 of the piston 70 and the outer wall 76 to fluidly isolate a first portion 84 (e.g., sealed annular space or chamber) of the chamber 80 from a second portion 86 (e.g., sealed annular space or chamber) of the chamber 80.

In operation, fluid (e.g., gas or liquid) may be provided via a first set of fluid conduits 90 (e.g., one or more fluid conduits 92 extending radially through the body 56 and one or more fluid conduits 94 extending radially through the outer wall 76) to the first portion 84 of the chamber 80 to exert a force against a surface 98 (e.g., top axially-facing surface) of the piston 70, thereby driving the piston assembly 68 away from the packer assembly 62 in the direction of arrow 100 and/or maintaining the piston assembly 68 in a first position 102 within the chamber 80. When the piston assembly 68 is in the illustrated first position 102, the annular BOP 42 is in the open position 50, and a surface 104 (e.g., bottom axially-facing surface) of the piston 70 may contact a surface 106 (e.g., top axially-facing surface) of the lower wall 78. It should be appreciated that the one or more fluid conduits 92 may be circumferentially aligned with the one or more fluid conduits 94; however, as shown, one or more of the annular seals 82 may be positioned to axially above the one or more fluid conduits 92 and the one or more fluid conduits 94 and one or more of the annular seals 82 may be positioned to axially below the one or more fluid conduits 92 and the one or more fluid conduits 94, thereby forming a seal between the outer wall 76 and the body 56 and facilitating fluid flow between the one or more fluid conduits 92 and the one or more fluid conduits 94.

To adjust the annular BOP 42 from the illustrated open position 50 to the closed position, fluid may be provided via a second set of fluid conduits 110 (e.g., one or more fluid conduits 112 extending radially through the body 56 and one or more fluid conduits 114 extending radially through the outer wall 76) to the second portion 86 of the chamber 80 to exert a force against the surface 104 of the piston 70, thereby driving the piston assembly 68 toward from the packer assembly 62 in the direction of arrow 100 to reach a second position within the chamber 80. It should be appreciated that the one or more fluid conduits 110 may be circumferentially aligned with the one or more fluid conduits 112; however, one or more of the annular seals 82 may be positioned to axially above and below the one or more fluid conduits 110 and the one or more fluid conduits 112, thereby forming a seal between the outer wall 76 and the body 56 and facilitating fluid flow between the one or more fluid conduits 110 and the one or more fluid conduits 112.

As shown, the push plate 72 includes a contacting surface 124 (e.g., annular surface or upper annular surface) that is configured to contact the packer assembly 62 (e.g., the packer 64, the inserts 65, and/or the donut 66). As the piston assembly 68 moves upward, the push plate 72 applies respective compressive forces on the packer assembly 62, thereby driving the packer assembly 62 upward. When driven upward by the push plate 72, the packer assembly 62 may move upward and inward within the top 58 to the closed position in which the packer 62 seals around the tubular string 24 extending through the central bore 44 and/or closes off the central bore 44. Thus, the piston assembly 68 may be driven in the axial direction 30 within the chamber 80 to adjust the annular BOP 42 from the open position 50 to the closed position.

In the illustrated embodiment, the operating system cartridge 60 is supported within a recess 140 (e.g., annular groove or recess) defined in the housing 54. For example, as shown, a surface 142 (e.g., bottom axially-facing surface) of the lower wall 78 contacts and is supported on a surface 144 (e.g., axially-facing surface) of the body 56 of the housing 54. When the operating system cartridge 60 is positioned within the housing 54, a radially-outer surface 146 (e.g., annular surface) of the outer wall 76 may contact a radially-inner surface 148 (e.g., annular surface) of the body 56 of the housing 54, and a radially-inner surface 150 (e.g., annular surface) of the inner wall 74 may define and/or surround a portion of the central bore 44. In some embodiments, the operating system cartridge 60 may be coupled to the housing 54 (e.g., via one or more fasteners), such as one or more fasteners 151 that are spaced apart about the circumference of the inner wall 74 and extend axially through the inner wall 74 into a portion of the body 56 of the housing 54.

As discussed in more detail below, the operating system cartridge 60 may be preassembled (e.g., the components may be coupled to one another) prior to installation within the housing 54 of the annular BOP 42. Thus, the components of the operating system cartridge 60 may be inserted into the annular BOP 42 together as a unit and/or removed from the annular BOP 42 together as a unit (e.g., without separating the components from one another prior to removal from the annular BOP 42). Advantageously, the operating system cartridge 60 may facilitate testing (e.g., of a condition of the annular seals 82 and/or operation of the piston assembly 68) of the operating system cartridge 60 prior to installation within the housing 54 of the annular BOP 42 and/or may enable efficient maintenance operations (e.g., inspection, repair, and/or replacement), thereby reducing well downtime, for example.

Figure 3:
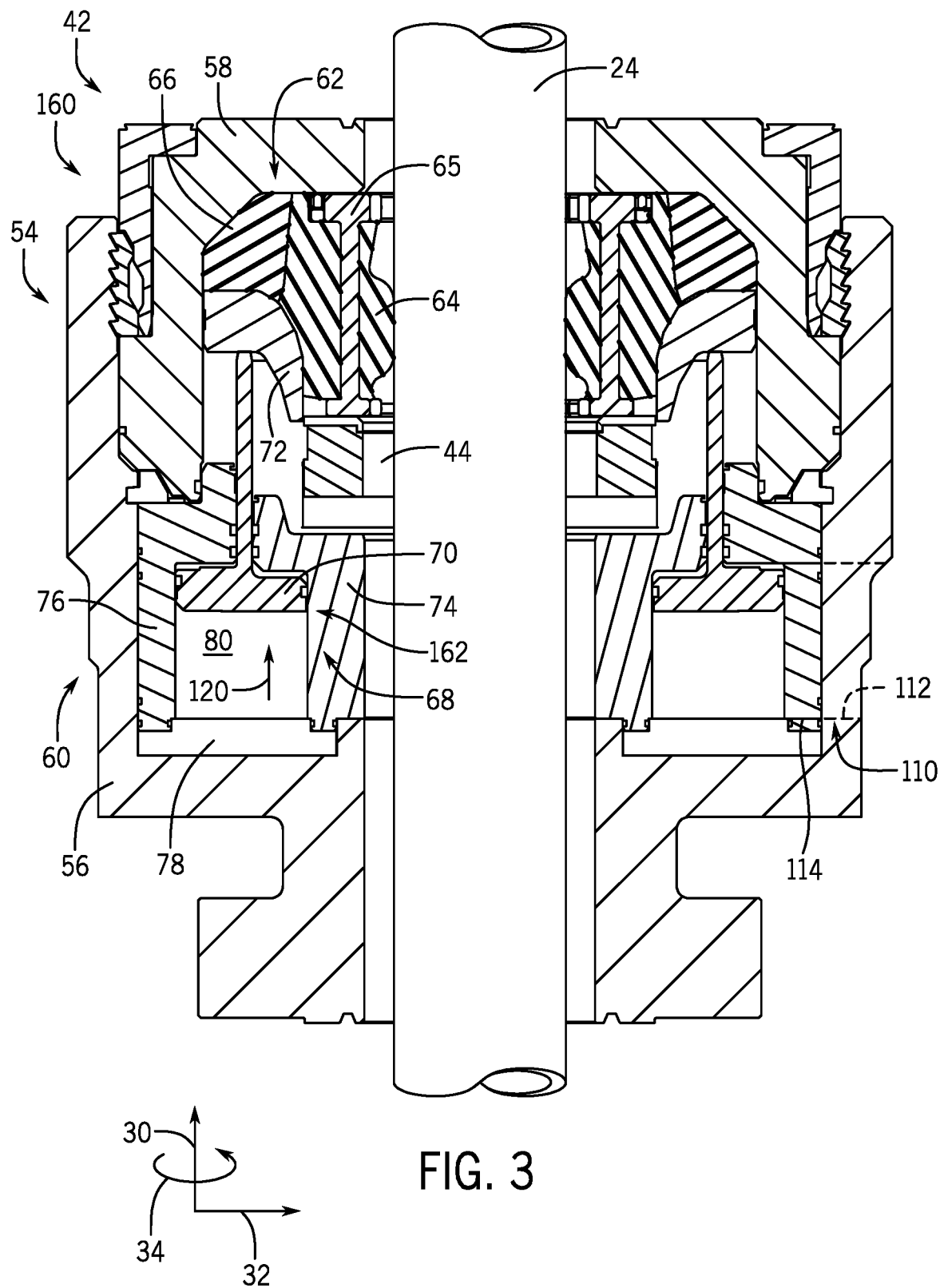
FIG. 3 is a cross-sectional side view of the annular BOP of FIG. 2 in a closed position.

With the foregoing in mind, FIG. 3 is a cross-sectional side view of an embodiment of the annular BOP 42 in a closed position 160. In the closed position 160, the packer assembly 62 seals about the tubular string 24 extending through the central bore 44 and/or closes the central bore 44, thereby blocking fluid from flowing through the central bore 44 and above the packer assembly 62. As discussed above, the piston assembly 68 moves in the axial direction 30 upon application of fluid from the second set of fluid conduits 110 from the first position 102 (FIG. 2) to the illustrated second position 162, thereby driving the packer assembly 62 in the axial direction 30. As the packer assembly 62 moves in the axial direction 30, the push plate 72 and the top 58 squeeze the flexible material of the packer 64 and/or the donut 66 inward and upward to seal about the tubular string 24 and/or to close the central bore 44.

Figure 4:
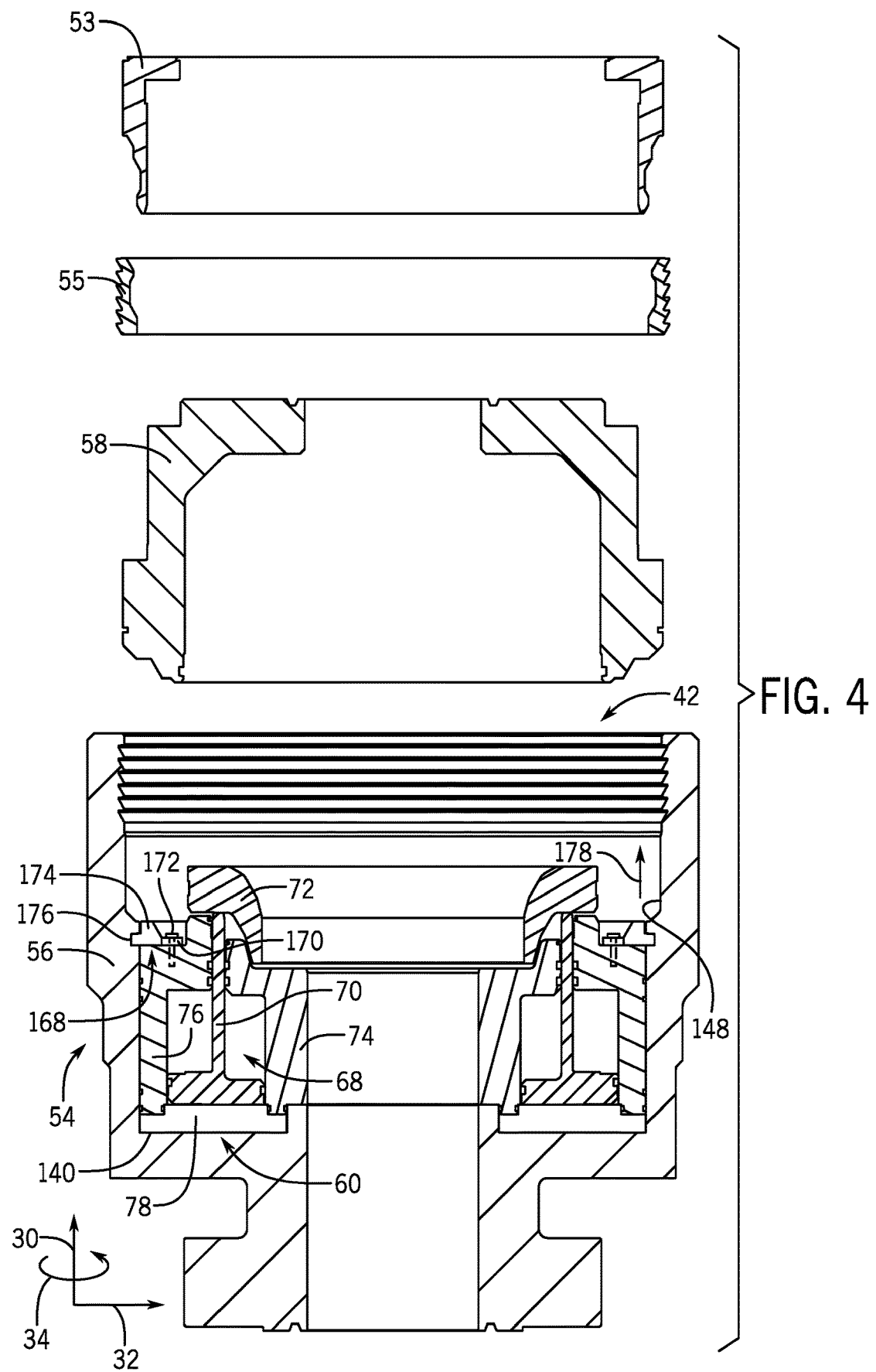
FIG. 4 is a cross-sectional side view of a portion of the annular BOP of FIG. 2 with a top of a housing of the annular BOP removed to facilitate removal of the operating system cartridge.
Figure 5:
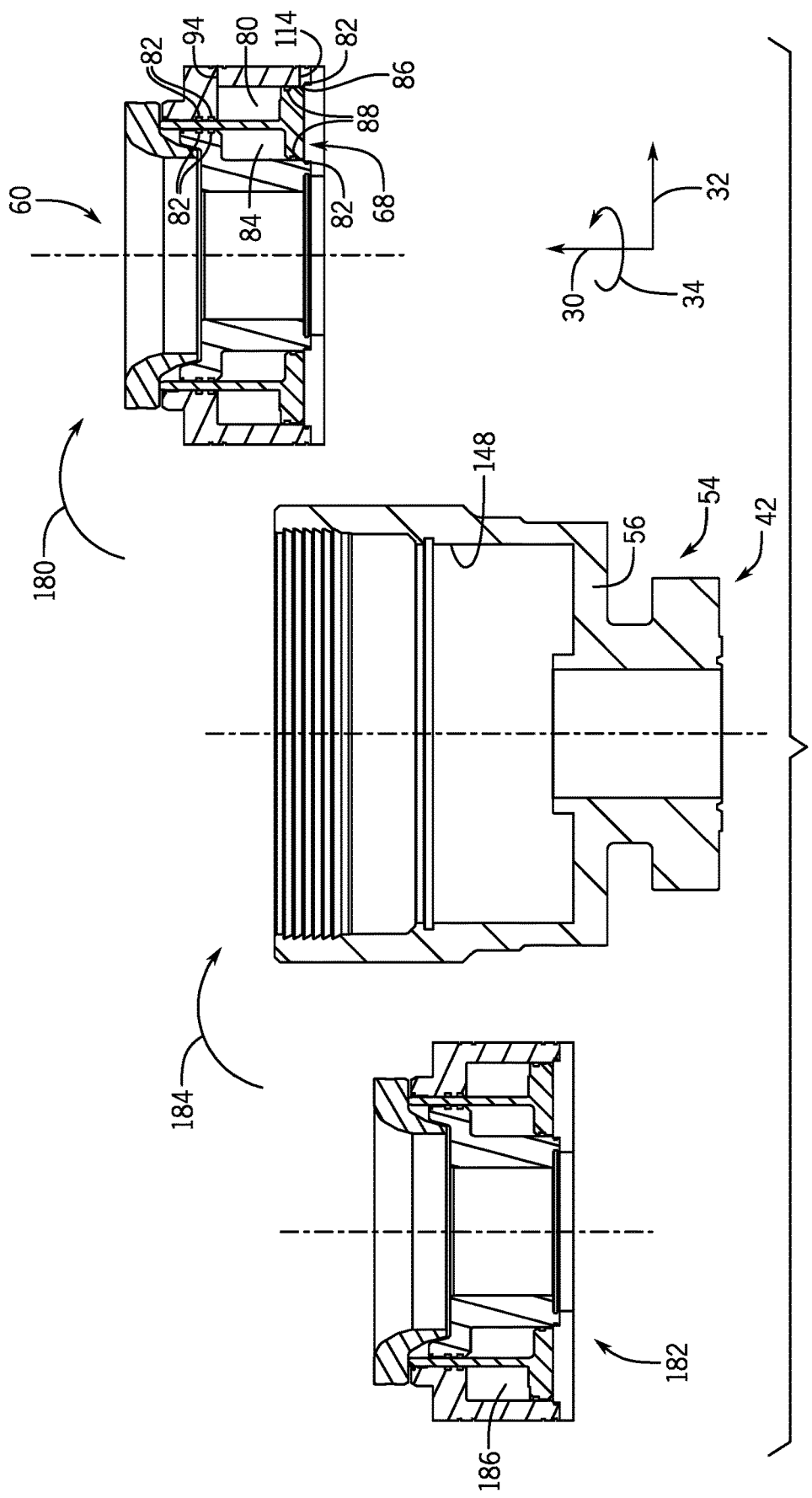
FIG. 5 is a cross-sectional side view of the portion of the annular BOP of FIG. 4 with the operating system cartridge removed to facilitate insertion of another operating system cartridge.

As noted above, the components of the operating system cartridge 60 may be coupled to one another (e.g., via fasteners, such as bolts) and inserted into the annular BOP 42 together as a unit and/or removed from the annular BOP 42 together as a unit. With the foregoing in mind, FIGS. 4 and 5 illustrate steps that may be taken to remove and to install the operating system cartridge 60. FIG. 4 is a cross-sectional side view of the annular BOP of FIG. 2 after removal of the top 58 of the housing 54 of the annular BOP 42. It should be appreciated that the top 58 may be separated from the body 56 of the housing 54 of the annular BOP 42 via any suitable technique. For example, in the illustrated embodiment, the actuator ring 53 may be separated from the top 58 (e.g., via removal of fasteners, such as bolts, that may be used to couple the actuator ring 53 to the top 58). The actuator ring 53 may then be withdrawn in the axial direction 30 from its position radially between the top 58 and the toothed split lock ring 55, thereby causing the split lock ring 55 to move radially-inwardly and disengage from the corresponding features (e.g., teeth) of the body 56 of the housing 54. The split lock ring 55 and the top 58 may then be moved in the axial direction 30 away from the body 56 of the housing 54.

After separation of the top 58 from the body 56 of the housing 54, a retaining assembly 168 may be removed from the housing 54 to enable the operating system cartridge 60 to move relative to the housing 54. For example, in the illustrated embodiment, the retaining assembly 168 includes a retaining ring 170 (e.g., annular retaining ring) that is coupled to the operating cartridge 60 (e.g., to the outer wall 76 via one or more fasteners 172) and one or more lock segments 174 (e.g., c-shaped ring or multiple segments spaced apart from one another and positioned circumferentially about the housing 54) that are configured to engage one or more corresponding grooves 176 (e.g., annular grooves or grooves spaced apart from one another and positioned circumferentially about the housing 54) formed in the radially-inner surface 148 of the body 56 of the housing 54. Thus, in some embodiments, the retaining ring 170 may be separated from the operating system cartridge 60 (e.g., via removal of the one or more fasteners 172). After removal of the retaining ring 170, the one or more lock segments 172 may disengage or be removed from the one or more corresponding grooves 176. With the retaining ring 170 and the one or more lock segments 172 removed from the housing 54, the operating system cartridge 60 may be moved (e.g., pulled by an operator or a tool) axially in the direction of arrow 178 to remove and separate the operating system cartridge 60 from the housing 54.

It should be appreciated that during operation of the annular BOP 42, the retaining ring 170 may hold or support the one or more lock segments 172 within the one or more corresponding grooves 176, thereby blocking movement of the operating system cartridge 60 relative to the body 56 of the housing 54. It should be also be appreciated that the retaining assembly 168 may have any suitable configuration that blocks movement of the operating system cartridge 60 relative to the body 56 of the housing 54 when engaged (e.g., in a locked position or installed within the housing 54) and that enables removal of the operating system cartridge 60 as a unit from the housing 54 when disengaged (e.g., in an unlocked position or removed from the housing 54). For example, in some embodiments, the one or more lock segments 172 may engage one or more corresponding grooves in the operating system cartridge 60, and the retaining ring 170 may be coupled to the housing 54.

FIG. 5 is a cross-sectional side view of the annular BOP 42 after removal of the operating system cartridge 60 from the body 56 of the housing 54, as shown by arrow 180. In some embodiments, the operating system cartridge 60 may be removed, inspected, tested, repaired, and/or reinserted into the annular BOP 42. For example, the operating system cartridge 60 may be tested by providing fluid (e.g., test fluid) via the one or more conduits 94 and observing whether the fluid leaks from the first portion 84 of the chamber 80 (e.g., across the seals 82), whether fluid exits the conduit 114, which would be indicative of damage to the seals 88, and/or whether the piston assembly 68 moves relative to the inner wall 74, the outer wall 76, and the lower wall 78 in the expected manner. Additionally or alternatively, the operating system cartridge 60 may be tested by providing fluid via the one or more fluid conduits 114 and observing whether the fluid leaks from the second portion 86 of the chamber 80 (e.g., across the seals 82), whether fluid exits the conduit 94, which would be indicative of damage to the seals 88, and/or whether the piston assembly 68 moves relative to the inner wall 74, the outer wall 76, and the lower wall 78 in the expected manner. It should be appreciated that an operator may test the operating system cartridge 60 by visually observing leaks (e.g., the presence of fluid) and/or movement of the piston assembly 68, or that one or more sensors and a processing system (e.g., having a processor configured to process signals generated by the one or more sensors) may be utilized to monitor and provide outputs indicative of the pressure within the spaces 84, 86, the presence of fluid at various locations proximate the seals 82, and/or one or more characteristics of the movement of the piston assembly 68 (e.g., rate of movement), for example. Advantageously, the configuration of the operating system cartridge 60 defines the first and second portions 84, 86 of the chamber 80, which enables testing of the seals 82, 88 when the operating system cartridge 60 is not installed within the housing 54. In turn, such testing enables efficient diagnosis of seals 82, 88 or other components that need repair or replacement, and thus, also enables efficient maintenance operations and may reduce well downtime, for example. In some embodiments, because the operating system cartridge 60 is tested prior to installation within the housing 54 of the annular BOP 42, testing of the operating system cartridge 60 after installation within the annular BOP 42 may be reduced and/or avoided and/or the likelihood that the operating system cartridge 60 functions properly within the housing 54 of the annular BOP 42 may be increased (e.g., as compared to configurations that do not enable testing of the seals 82, 88 and operation of the piston assembly 68 prior to installation within the housing 54 of the annular BOP 42).

When the operating system cartridge 60 is repaired and/or determined to be functioning properly, the operating system cartridge 60 may be installed within the annular BOP 42 by reversing the steps described above with respect to FIG. 4. For example, with reference to FIG. 4, the operating system cartridge 60 may be lowered into the housing 54 in a direction opposite of the arrow 178 until the lower wall 78 rests within the recess 140. The retaining assembly 168 may be installed, such as by positioning the one or more lock segments 174 within corresponding grooves 176 and fastening the retaining ring 170 to the operating system cartridge 60 via the one or more fasteners 172. The top 58 of the housing 54 may then be coupled to the body 56 of the housing 54, such as by positioning the top 58 axially above the operating system cartridge 60, aligning the split lock ring 55 with the corresponding features (e.g., teeth) formed in the body 56 of the housing 54, driving the actuator ring 53 between a portion of the top 58 and the split lock ring 55, and coupling the actuator ring 53 to the top 58 (e.g., via one or more fasteners, such as bolts).

In some embodiments, after removal of the operating system cartridge 60, another operating system cartridge 182 may be inserted into the body 56 housing 54, as shown by arrow 184. In operation, to facilitate efficient maintenance operations, the operating system cartridge 182 may be tested in the manner discussed above (e.g., by providing fluid via conduits into portions of the chamber 186) prior to removal of the operating system cartridge 60 and/or prior to installation into the housing 54. For example, the operating system cartridge 182 may be tested prior to removal of the operating system cartridge 60 to confirm that the operating system cartridge 182 is functioning properly. Then the operating system cartridge 60 may be removed from the housing 54 of the annular BOP 42 in the manner discussed above with respect to FIG. 4, and the operating system cartridge 182 may be (e.g., substantially immediately or promptly) installed in the housing 54 of the annular BOP 42 in the manner discussed above with respect to the operating system cartridge 60 (e.g., positioning the operating system cartridge 182 within the recess 140 of the body 56 of the housing 54, installing the retaining assembly 168, and coupling the top 58 to the body 56 of the housing 54).

Because the operating system cartridge 182 is tested prior to installation within the housing 54 of the annular BOP 42, testing of the operating system cartridge 182 after installation of the operating system cartridge 182 within the annular BOP 42 may be avoided and/or reduced and/or the likelihood that the operating system cartridge 182 functions properly within the housing 54 of the annular BOP 42 may be increased (e.g., as compared to configurations that do not enable testing of the seals 82, 88 and operation of the piston assembly 68 prior to installation within the housing 54 of the annular BOP 42).

It should be appreciated that while the operating system cartridge 182 is utilized within the annular BOP, the operating system cartridge 60 may then be inspected, tested, and/or repaired, and the operating system cartridge 60 may then be reinserted into the annular BOP 42 at a later time (e.g., according to a predetermined maintenance schedule or upon failure of the another operating system cartridge 182). Together, one or more operating system cartridges (e.g., including the operating system cartridge 60 and the operating system cartridge 182) may form a kit (e.g., maintenance kit) that may be utilized by an operator to efficiently perform maintenance operations for the annular BOP 42, thereby reducing well downtime. It should also be appreciated that the operating system cartridge 182 may include any of the features disclosed above with respect to the operating system cartridge 60.

Figure 6:
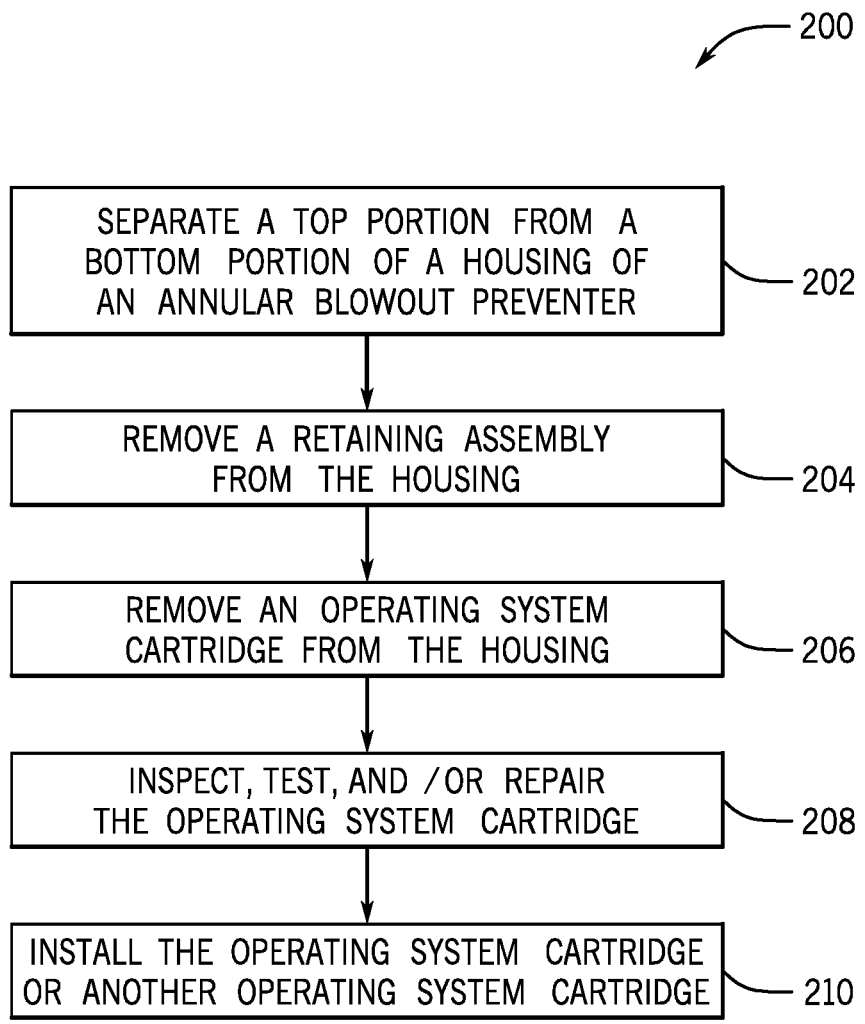
FIG. 6 is a flow diagram of an embodiment of a method of replacing an operating system cartridge of an annular BOP that may be used in the system of FIG. 1.

FIG. 6 is a flow diagram of an embodiment of a method 200 of replacing the operating system cartridge 60 of the annular BOP 42. The method 200 includes various steps represented by blocks. It should be noted that certain steps of the method 200 may be performed as an automated procedure by an electronic computing system (e.g., having one or more sensors, processing devices, etc.) and/or certain steps of the method 200 may be performed by an operator. Although the flow chart illustrates the steps in a certain sequence, it should be understood that the steps may be performed in any suitable order and certain steps may be carried out simultaneously, where appropriate. Further, certain steps or portions of the method 200 may be omitted and other steps may be added. The method 200 may be carried out periodically (e.g., based on a predetermined maintenance schedule), in response to an indication (e.g., detected leaks, operating test results) that the annular BOP 42 needs maintenance, or the like.

In step 202, the top 58 may be separated from the bottom 56 of the housing 54 of the annular BOP 42. As noted above, the top 58 may be separated from the bottom 56 of the housing 54 of the annular BOP 42 via any suitable technique. For example, the actuator ring 53 may be separated from the top 58. The actuator ring 53 may then be withdrawn in the axial direction 30 from its position radially between the top 58 and the toothed split lock ring 55, thereby causing the split lock ring 55 to move radially-inwardly and disengage from the corresponding features (e.g., teeth) of the body 56 of the housing 54. The split lock ring 55 and the top 58 may then be moved in the axial direction 30 away from the body 56 of the housing 54.

In step 204, the retaining assembly 168 may be removed from the housing 54 of the annular BOP 42 to enable the operating system cartridge 60 to move relative to the housing 54. For example, the retaining ring 170 may be separated from the operating system cartridge 60 (e.g., via removal of the one or more fasteners 172). After removal of the retaining ring 170, the one or more lock segments 172 may disengage or be removed from the one or more corresponding grooves 176.

In step 206, the operating system cartridge 60 may be moved (e.g., pulled) axially to remove the operating system cartridge 60 from the housing 54. Without the retaining assembly 168, the operating system cartridge 60 may be moved (e.g., pulled by an operator or a tool) in the axial direction 30 to remove and separate the operating system cartridge 60 from the housing 54.

In step 208, the operating system cartridge 60 may be inspected, tested, and/or repaired. In some embodiments, the operating system cartridge 60 may be removed, inspected, tested, repaired, and/or reinserted into the annular BOP 42. For example, the operating system cartridge 60 may be tested by providing fluid via the one or more conduits 94 and monitoring (e.g., via an operator and/or one or more sensors and a processing system) whether the fluid leaks from the first portion 84 of the chamber 80 (e.g., across the seals 82), whether fluid exits the conduit 114, which would be indicative of damage to the seals 88, and/or whether the piston assembly 68 moves relative to the inner wall 74, the outer wall 76, and the lower wall 78 in the expected manner. Additionally or alternatively, the operating system cartridge 60 may be tested by providing fluid via the one or more fluid conduits 114 and monitoring whether the fluid leaks from the second portion 86 of the chamber 80 (e.g., across the seals 82), whether fluid exits the conduit 94, which would be indicative of damage to the seals 88, and/or whether the piston assembly 68 moves relative to the inner wall 74, the outer wall 76, and the lower wall 78 in the expected manner. Such testing may enable efficient diagnosis of seals 82, 88 or other components that need repair or replacement, and thus, also enables efficient maintenance operations and may reduce well downtime, for example.

In step 210, the operating system cartridge 60 or another operating system cartridge 180 may be installed within the housing 54 of the annular BOP 42. In some embodiments, after the operating system cartridge 60 is repaired and/or determined to be functioning properly (e.g., an intact or satisfactory sealing condition of the seals and/or appropriate movement of the piston 70) via tests performed at step 208, the operating system cartridge 60 may be installed within the annular BOP 42. For example, the operating system cartridge 60 may be lowered into the housing 54 until the lower wall 78 rests within the recess 140. The retaining assembly 168 may be installed, such as by positioning the one or more lock segments 174 within corresponding grooves 176 and fastening the retaining ring 170 to the operating system cartridge 60 via the one or more fasteners 172. The top 58 of the housing 54 may then be coupled to the body 56 of the housing 54, such as by positioning the top 58 axially above the operating system cartridge 60, aligning the split lock ring 55 with the corresponding features (e.g., teeth) formed in the body 56 of the housing 54, driving the actuator ring 53 between a portion of the top 58 and the split lock ring 55, and coupling the actuator ring 53 to the top 58 (e.g., via one or more fasteners, such as bolts).

As noted above with respect to FIG. 5, in some embodiments, after removal of the operating system cartridge 60, another operating system cartridge 182 may be inserted into and installed within the body 56 housing 54. In some embodiments, to facilitate efficient maintenance operations, the operating system cartridge 182 may be tested in the manner discussed above (e.g., by providing fluid via conduits into portions of the chamber 186) prior to removal of the operating system cartridge 60 and/or prior to installation into the housing 54. For example, the operating system cartridge 182 may be tested prior to removal of the operating system cartridge 60 to confirm that the operating system cartridge 182 is functioning properly. Then the operating system cartridge 60 may be removed from the housing 54 of the annular BOP 42 in the manner discussed above with respect to FIG. 4, and the operating system cartridge 182 may be (e.g., substantially immediately or promptly) installed in the housing 54 of the annular BOP 42 in the manner discussed above with respect to the operating system cartridge 60 (e.g., positioning the operating system cartridge 182 within the recess 140 of the body 56 of the housing 54, installing the retaining assembly 168, and coupling the top 58 to the body 56 of the housing 54).

In some embodiments, the operating system cartridge 182 may be installed within the annular BOP 42, prior to step 208. That is, the operating system cartridge 60 may be inspected, tested, and/or repaired while the operating system cartridge 182 is installed within the annular BOP 42. In such cases, the operating system cartridge 60 may then be reinserted into the annular BOP 42 at a later time (e.g., according to a predetermined maintenance schedule or upon failure of the operating system cartridge 182).

While the disclosure may be susceptible to various modifications and alternative forms, specific embodiments have been shown by way of example in the drawings and have been described in detail herein. However, it should be understood that the invention is not intended to be limited to the particular forms disclosed. Rather, the disclosure is to cover all modifications, equivalents, and alternatives falling within the spirit and scope of the invention as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An operating system cartridge for an annular blowout preventer, comprising:
   one or more annular walls that define an annular chamber;
   a piston assembly comprising an annular piston positioned within the annular chamber and a pusher plate configured to contact an annular packer assembly of the annular blowout preventer when the operating system cartridge is installed within a housing of the annular blowout preventer; and
   one or more fluid conduits extending through the one or more annular walls, wherein the one or more fluid conduits are configured to provide a test fluid to the annular chamber to facilitate testing of the operating system cartridge prior to installation within the housing of the annular blowout preventer.

2. The operating system cartridge of claim 1, comprising one or more annular seals configured to seal the annular chamber from an external environment.

3. The operating system cartridge of claim 2, wherein the one or more fluid conduits are configured to provide the test fluid to the annular chamber to facilitate testing of a condition of the one or more annular seals.

4. The operating system cartridge of claim 1, wherein the one or more annular walls comprise a lower annular wall, an inner annular wall coupled to the lower annular wall, an outer annular wall coupled to the lower annular wall to define the annular chamber.

5. The operating system cartridge of claim 1, comprising a first annular seal that forms a first seal between a plate portion of the annular piston and the one or more annular walls, and a second annular seal that forms a second seal between the plate portion of the annular piston and the one or more annular walls to fluidly isolate a first portion of the annular chamber from a second portion of the annular chamber.

6. The operating system cartridge of claim 5, comprising a third annular seal that forms a third seal between a shaft portion of the annular piston and the one or more annular walls, and a fourth annular seal that forms a fourth seal between the shaft portion of the annular piston and the one or more annular walls.

7. The operating system cartridge of claim 1, wherein the operating system cartridge is configured to be inserted into and removed from the housing of the annular blowout preventer as a unit without separating the one or more annular walls, the piston assembly, and the one or more fluid conduits from one another.

8. The operating system cartridge of claim 1, wherein a radially-outer surface of an outer annular wall of the one or more annular walls is configured to contact a radially-inner surface of the housing of the annular blowout preventer while the first operating system cartridge is installed within the housing.

9. The operating system cartridge of claim 8, wherein the one or more fluid conduits extend radially through the outer annular wall and are configured to receive an operating fluid from one or more housing fluid conduits that extend radially through the housing of the annular blowout preventer to enable the piston assembly to drive the annular packer assembly of the annular blowout preventer from an open position to a closed position while the first operating system cartridge is installed within the housing.

10. A system, comprising:
    a first operating system cartridge configured to be installed within a housing of an annular blowout preventer to drive a packer assembly of the annular blowout preventer from an open position to a closed position, comprising:
    an annular chamber;
    an annular piston assembly comprising an annular piston positioned within the annular chamber;
    one or more annular seals configured to seal the annular chamber from an external environment; and
    one or more fluid conduits extending configured to provide a test fluid to the annular chamber to facilitate testing of a condition of the one or more annular seals prior to installation within the housing of the annular blowout preventer.

11. The system of claim 10, wherein the annular chamber is defined by a lower annular wall, an inner annular wall coupled to the lower annular wall, and an outer annular wall coupled to the lower annular wall.

12. The system of claim 10, wherein the operating system cartridge is configured to be inserted into and removed from the housing of the annular blowout preventer as a unit without separating the annular chamber, the piston assembly, the one or more annular seals, and the one or more fluid conduits from one another.

13. The system of claim 10, comprising the annular blowout preventer, wherein the housing of the annular blowout preventer comprises an annular recess configured to removably receive the first operating system cartridge.

14. The system of claim 10, comprising a retaining assembly comprising a lock segment configured to engage a corresponding groove formed in one of the first operating system cartridge or the housing of the annular blowout preventer, a retaining ring configured to maintain the lock segment within the corresponding groove, and a fastener configured to couple the retaining ring to the other of the first operating system cartridge or the housing of the annular blowout preventer to block movement of the first operating system cartridge relative to the housing of the annular blowout preventer.

15. The system of claim 10, comprising a second operating system cartridge configured to be installed within the housing of the annular blowout preventer to drive the packer assembly of the annular blowout preventer from the open position to the closed position, wherein the first operating system cartridge and the second operating system cartridge form a maintenance kit that enables testing a respective condition of respective annular seals of one of the first or second operating system cartridges while the other of the first or second operating system cartridges is installed within the housing of the annular blowout preventer.

16. A method of performing maintenance operations for an annular blowout preventer, comprising:
    providing a fluid via one or more fluid conduits into an annular chamber of a first operating system cartridge to drive a piston assembly within the annular chamber;
    determining a condition of an annular seal configured to seal the annular chamber by monitoring whether the fluid flows out of the annular chamber; and
    installing the first operating system cartridge into a housing of the annular blowout preventer as a unit after determining that the condition of the seal is satisfactory.

17. The method of claim 16, wherein installing the first operating system cartridge comprises positioning the first operating system cartridge within an annular recess defined in the housing of the annular blowout preventer.

18. The method of claim 16, wherein installing the first operating system cartridge comprises aligning a lock segment with a corresponding groove formed in one of the first operating system cartridge or the housing of the annular blowout preventer and coupling a retaining ring configured to maintain the lock segment within the corresponding groove to the other of the first operating system cartridge or the housing of the annular blowout preventer to block movement of the first operating system cartridge relative to the housing of the annular blowout preventer.

19. The method of claim 16, comprising removing the first operating system cartridge from the housing of the annular blowout preventer as the unit without separating the annular chamber or the piston assembly from one another.

20. The method of claim 16, comprising removing a second operating system cartridge from the housing of the annular blowout preventer after determining that the condition of the seal of the first operating system cartridge is satisfactory.

\* \* \* \* \*